(No Model.)
L. J. HAUSERMAN.
ANIMAL TRAP.
No. 336,998. Patented Mar. 2, 1886.
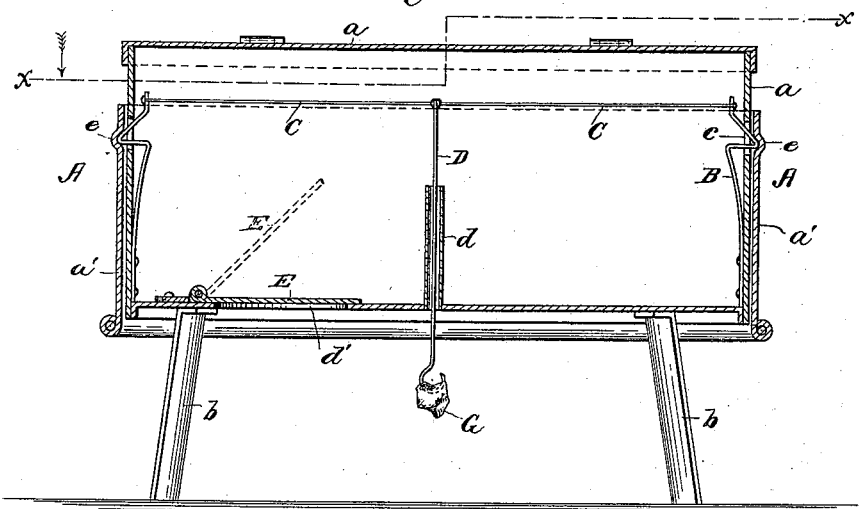
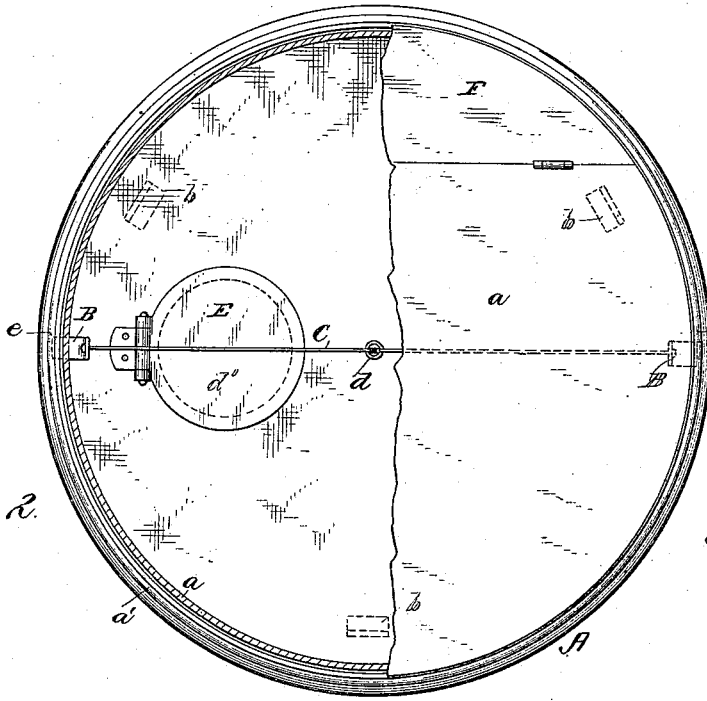
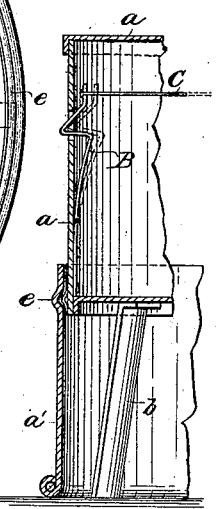
Witnesses.
Henry Paul Hunter
Addie Kavanagh
Inventor.
Louis J. Hauserman,
per F. F. Warner,
his Attorney.

UNITED STATES PATENT OFFICE.

LOUIS J. HAUSERMAN, OF CHICAGO, ILLINOIS.

ANIMAL-TRAP.

SPECIFICATION forming part of Letters Patent No. 336,998, dated March 2, 1886.

Application filed June 15, 1885. Serial No. 168,813. (No model.)

*To all whom it may concern:*

Be it known that I, LOUIS J. HAUSERMAN, a citizen of the United States, residing at Chicago, in the county of Cook and State of Illinois, have invented certain new and useful Improvements in Animal-Traps, of which the following, in connection with the accompanying drawings, is a specification.

In the drawings, Figure 1 is a vertical central section of an animal-trap embodying my invention. Fig. 2 is a section in the plane of the line $x\ x$ of Fig. 1, viewed in the direction indicated by the arrow there shown, and Fig. 3 is a sectional detail showing the position of the parts when the trap is closed.

Like letters of reference indicate like parts.

A represents a box-like structure made of two parts, $a$ and $a'$, the former of which parts is adapted to fit loosely into the other, as is indicated in the drawings. In other words, the part A is extensible downward, the part $a$ being supported, as shown, upon legs or supports $b\ b$.

With the exception hereinafter stated, the part $a$ is closed at the top, bottom, and sides, and the part $a'$ is open at the top and bottom.

B B are spring-catches applied to the interior of the part $a$, and bent to project through openings $c\ c$ in the sides thereof.

C is a cord or wire connecting the upper ends of the springs or catches B B.

D is a wire or cord depending from the central part of the wire or cord C, and passing through the bottom of the part $a$ of the box A. I deem it best to surround or guard the cord or wire D by means of a tube or guard, $d$. In the bottom of the part $a$, I make an opening, $d'$, and E is a trap or hinged door covering the said opening and opening upward. In the top of the part $a$, I make an upwardly-opening door, F. In the upper portion of the part $a'$, I make an annular groove or recess, $e$, and the catches B B project into this groove or recess when the part $a'$ is in its raised position, and retain it there temporarily.

G is a bait on the lower end of the depending cord D.

When the trap is set for a rat or other animal, the parts are arranged as shown in Fig. 1, when the bait, as will be perceived, is exposed, and is accessible. When the rat or other animal nibbles the bait, the wire or cord C is disturbed in such a manner that it will draw the spring-catches out of engagement with the part $a'$ of the box A, and the part $a'$ will fall to the floor, thus confining the rat or other animal. The rat or animal, finding itself confined, will seek escape through the opening $d'$, and will enter the part $a$ of the trap. As soon as the animal enters the part $a$ the door E will close automatically and confine him there. The trap may now be again set by raising the part $a'$ until it is engaged by the springs, which suspend it in its raised position, and the rat or other animal caught may be removed through the door F.

I am aware of the construction shown and described in Letters Patent No. 79,577, dated July 7, 1868, and granted to Joseph Kohler, and in the patent to John W. DeVilbiss, Jr., No. 148,427, granted March 10, 1874, and I do not, therefore, here intend to claim, broadly, the features of construction therein shown and described.

Having thus described my invention, what I claim as new, and desire to secure by Letters Patent, is—

1. The combination, in an animal-trap, of the raised part or cage $a$, the gravitating part $a'$, the spring-catches B B, the wire or cord C, and the cord or wire D, substantially as and for the purposes specified.

2. The combination of the raised part or cage $a$, having therein the doors E and F, the spring-catches B B, projecting through the part $a$, the gravitating part or section $a'$, having therein the groove $e$, and the wires or cords C and D, substantially as and for the purposes specified.

In testimony that I claim the foregoing as my own I hereby affix my signature in presence of two witnesses.

LOUIS J. HAUSERMAN.

Witnesses:
F. F. WARNER,
HENRY FRANKFURTER.